US008282235B2

(12) United States Patent
Gilligan

(10) Patent No.: US 8,282,235 B2
(45) Date of Patent: Oct. 9, 2012

(54) LIGHTED BAG AND BACKPACK

(76) Inventor: James Gilligan, Northport, NY (US)

( * ) Notice: Subject to any disclaimer, the term of this patent is extended or adjusted under 35 U.S.C. 154(b) by 425 days.

(21) Appl. No.: 12/456,573

(22) Filed: Jun. 18, 2009

(65) Prior Publication Data

US 2009/0316426 A1     Dec. 24, 2009

Related U.S. Application Data

(60) Provisional application No. 61/132,213, filed on Jun. 18, 2009.

(51) Int. Cl.
*A45C 15/06* (2006.01)

(52) U.S. Cl. .............. 362/156; 362/249.01; 362/249.08; 362/249.09; 362/249.1; 362/570

(58) Field of Classification Search .................. 362/103, 362/108, 154, 156, 227, 249.01, 249.07–249.09, 362/249.1, 285, 551, 554–555, 570
See application file for complete search history.

(56) References Cited

U.S. PATENT DOCUMENTS

| 3,609,342 | A  | * | 9/1971  | Wisniewski | 362/156 |
| 3,800,134 | A  | * | 3/1974  | Castaldo   | 362/155 |
| 6,447,142 | B1 | * | 9/2002  | Weir       | 362/156 |
| 6,499,857 | B1 | * | 12/2002 | Lumley     | 362/154 |
| 7,111,959 | B2 | * | 9/2006  | Kurcz et al. | 362/156 |

* cited by examiner

*Primary Examiner* — Stephen F Husar
*Assistant Examiner* — Meghan Dunwiddie
(74) *Attorney, Agent, or Firm* — Leo G. Lenna, Esq

(57) ABSTRACT

A lighted workbag or backpack having a positionable light source configured so as to provide significant illumination into the interior portion of the workbag or an external work area or the path in front of the backpack. The light source having a gooseneck configuration is mounted in a column or pouch positioned in the back of the backpack that allows the light to extend over the shoulder of a user wearing the backpack so as to illuminate the area in front of the user.

18 Claims, 7 Drawing Sheets

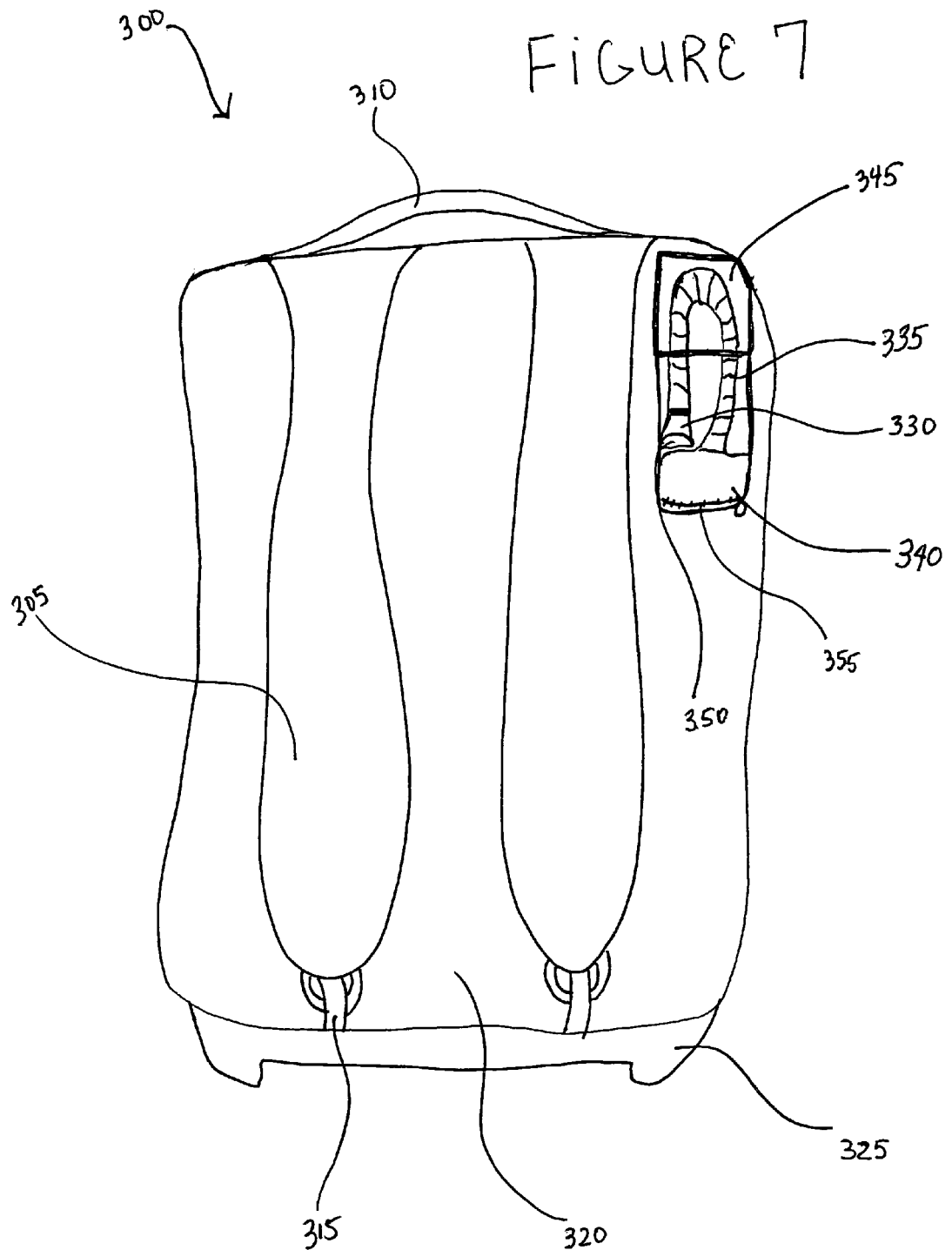

LIGHTED BAG AND BACKPACK

CROSS-REFERENCE TO RELATED APPLICATIONS

This application is a non-provisional application and claims benefit to provisional application having the Ser. No. 61/132,213 filed Jun. 18, 2009, the disclosure of which is incorporated herein by reference in is entirety.

FIELD OF THE INVENTION

The present invention relates to illumination of bags and surrounding work places and more particularly, to a detachable light that is attached to a rim of bag or placed in a pouch of a backpack to provide illumination into the bag and when redirected to provide illumination to an area in which it is directed. More particularly, the present invention relates to an illumination device that can be used by workers to find tools within a workbag and then redirected to shine light, hands-free, on an area in which work is to be perform.

DESCRIPTION OF THE PRIOR ART

Manufactures have struggled to devise illuminating devices that are useful in pocketbooks, book bags, luggage, backpacks and the like. Some of these illuminating devices can be separated from the bags to function as a handy light. Others are integrally connected to the associated bag. Several of these devices are discussed below as well as the problems associated with each of the devices.

U.S. Pat. No. 2,179,214 discloses an illuminating device for pocketbooks or like receptacles. It comprises a light attached to the inside flap of a pocket book powered by a set of batteries. A slide fastener actuates electrical conductors passing through one of the sides of the pocketbook compartment. The illuminating device is external to the pocketbook compartment. This device is specifically designed and positioned to provide only minimal illumination to the inside of the pocketbook. The positioning of the light source inside the bag makes it difficult, if not impossible, to shine the device in any particular direction outside of the pocketbook since the inside flap would have to be held open in order for the light to shine in this manner, thereby defeating the purpose of a hands-free lighting device. In addition, the light source provides only minimal light, since it is enclosed inside the pocketbook, and therefore would even if it can be positioned to shine outside of the pocket book, would provide only negligible light.

U.S. Pat. No. 2,218,396 also discloses an illumination device for pocketbooks. The illuminating light is attached to a flap on a pocketbook and illuminates the contents of the pocketbook from an external location. A rectangular plate holds the illuminating lamp. The plate has an aperture inside the pocketbook through which the lamp is viewable. Illumination is thereby provided whether or not the pocketbook is closed. A rectangular window is additionally provided for external illumination. Sliding a closure switch actuates the lamp. Its power emanates from a set of batteries positioned at the bottom of the pocketbook and connected to the illuminating light and switch by means of conducting metallic wires. Owing to the external bulb location and the relatively small window aperture, here too only a small portion of the pocketbook is illuminated. To overcome this inefficient illumination arrangement, the light must be very bright causing operation thereof at a high temperature. Such temperatures increase chances for damage to the pocketbook contents and will likely injure users upon contact. Battery power is quickly consumed limiting the illumination time. Also being located inside the pocket book makes it useless as a hands-free illumination source for a construction worker or electrician using the light shined from the bag to illuminate a work place.

U.S. Pat. No. 2,300,108 also discloses an illuminating mechanism for handbags. The illuminating device is affixed to the one of the frames of a handbag, overnight bag, suitcase or the like. An illuminating means is embedded in a metallic plate securely held by the frame. Passed through an opening in the plate is an illuminating bulb for illuminating the interior of the bag. The bulb is energized by spring contacts, which close an electrical circuit when the frames of the bag are moved apart from one another. Illumination is accomplished from a location external to the bag's interior. As a result, the illumination provided to the pocketbook's interior contents is minimal. Moreover, the light source is not directional to outside of the bag and has little to no use for illuminating an external workplace.

U.S. Pat. No. 2,304,387 discloses an illuminated handbag. A pocket construction is affixed to the inside wall of the bag, which contains two rows of batteries. Also affixed to the inside wall are a bulb and an actuating mechanism, which turns on the light when the bag is opened. The illuminating light is affixed near the bottom of the pocket construction, shining light to the contents of the handbag. Mounting is accomplished by a pocket construction affixed to one of the sidewalls of the handbag. The illuminating bulb is mounted on the bottom of the pocket construction, and directs the light toward the contents of the handbag when the bulb is activated. Illuminating light is directed in one direction solely, causing objects to shadow each other. As a consequence, complete visibility of the handbag contents is impeded. The high temperature bulb and its location inside a pocket within the handbag's interior tend to melt heat sensitive objects such as lipstick, or ignite flammable articles such as tissue paper. Hand contact with the hot bulb may cause skin damage. And finally the light is limited to the interior of the bag unless held open to provide minimal illumination making hand-on not hands-free.

U.S. Pat. No. 2,334,480 discloses still yet another handbag illuminating device. Here a common flashlight is attached to the bottom of a handbag, brief case or the like. The handbag has an opening in the bottom to attach the flashlight, which is turned on in the usual way. Such a device is not used as an illuminating device to view the contents of a pocketbook. It consumes substantial power, and is large, heavy and expensive. If left in the "on" condition for an appreciable time period, the flashlight develops heat likely to damage the pocketbook contents. Moreover, this is simply no more than a pocket to store a convention flashlight making it readily available when necessary. This device does not provide hands-free illumination, is only directional by moving it by hand and holding it there to illuminate a particular area very much like a conventional flashlight.

U.S. Pat. No. 2,427,201 discloses a handbag light. Means are disclosed for illuminating the handbag's interior. The construction of the illumination device inside the bag meets the object of the invention namely, illuminating the inside of the bag not the outside of the bag.

U.S. Pat. No. 2,558,606 discloses still yet another purse light limited to the interior of the bag. A compact illuminating device in the form of flashlight with two batteries and a centrally located illuminating bulb with a transparent member directs light onto the contents of a purse. The flashlight device is removable; and can be inserted into a receptacle on the inner sidewall of a purse. Movement of a switch on the flashlight body accomplishes manual activation of the flashlight. The bulb carries a reflecting and focusing transparent member that downwardly directs light from the bulb to illuminate the contents of a purse. Inasmuch as bulb illumination is directed downwards solely, objects in the purse can shadow each other, limiting the user's ability to see them. Light available for illumination is limited due to the distance between the flashlight and the purse contents. The focusing element encases the high-temperature flashlight bulb, and prevents direct contact of purse contents with the hot bulb.

U.S. Pat. No. 2,647,201 discloses a lady's lighted handbag. The back wall of a handbag is provided with a channel within which are enclosed a set of batteries, electrical connections and bulbs. A corrugated reflecting mirror directs the illuminating light towards the bottom of the handbag. The illuminating light bulbs are turned "on" by a switch 64. Since the light bulbs are expected to be hot, any contact between the lighted bulbs with heat sensitive contents of the handbag will result in melting or product deterioration. Moreover, physical contact with these bulbs may cause skin damage or ignition of flammable material, such as tissue paper. If the handbag is suddenly inverted, objects in the handbag may impact the illuminating bulbs, causing bulb breakage and production of glass shards. Since bulb illumination is directly downwards solely, objects in the purse can shadow each other preventing full visibility of handbag contents. The large distance between the bulbs and the bag contents results in poor illumination unless the bulbs are run at high intensity levels, which would increase bulb temperatures and likely damage heat sensitive contents of the handbag.

U.S. Pat. No. 3,408,489 discloses an illuminable handbag. An incandescent illuminating light affixed to one of the sidewalls of a handbag is rotated to point light in any direction within a plane parallel to the sidewall surface. The light is encased in a cup shaped shield having one end open, where the light is directed. The other end of the cup shaped shield is closed. The shield is rotatably mounted to direct the light in a plane parallel to the sidewall of the handbag. Objects are thereby illuminated in any direction, and illumination of selected portions of the handbag is facilitated. When switched to the "on" condition, a battery provides power to the incandescent, illuminating light bulb. The illuminating light runs hot, and must be prevented from contact with heat sensitive or flammable material. It projects a narrow beam of light, which only illuminates a small portion of the handbag contents. Since illumination is directed downwards solely, objects in the purse can shadow each other preventing full visibility of handbag contents. Owing to the large distance between the incandescent light bulbs and the handbag contents, illumination of objects is limited. If the handbag is suddenly inverted, objects in the handbag may impact the illuminating bulb. In such instances, the bulb would likely break, producing glass shards.

U.S. Pat. No. 3,609,341 discloses an illuminated handbag. A rotatable clasp functions as a switch turning "on" a plurality of lights sequentially. Using appropriate circuits, all lamps can be turned "on" simultaneously. Incandescent lights are mounted in the sidewalls of various compartments of a handbag. A battery powers the light bulbs through the rotatable clasp switch. Incandescent bulbs tend to burn hot. They can easily damage heat sensitive objects such as lipstick and the like. Heat from incandescent bulbs can ignite tissue paper, and burn the handbag contents or its user. Inasmuch as bulb illumination is directed strictly downwards, objects in the purse can shadow each other, preventing full visibility of handbag contents. The large distance between the bulbs and the handbag contents results in poor illumination. If the handbag is suddenly inverted, objects there within may impact these multiple illuminating bulbs, causing breakage and production of glass shards.

U.S. Pat. No. 3,800,134 discloses an illuminated handbag apparatus having a walk-along light. The handbag interior is provided with a detachable freestanding illuminating incandescent light bulb connected by an elongate flexible conductor. A switch connects the incandescent light bulb to a battery power source. The switch may be activated by the closure mechanism of the handbag, whereby the light bulb goes on when the handbag is opened. Alternatively, the light bulb can be independently controlled to illuminate a pathway regardless of whether the handbag is closed or open. The incandescent light may be tilted to illuminate the interior of the handbag or drawn out of the handbag to illuminate the path. This incandescent light bulb invariably runs hot. It is unprotected, and can damage heat sensitive products in the handbag; or ignite tissue paper; or burn the user. The light is situated far above products in the handbag, limiting illumination of handbag contents. Although this light can be taken out of the purse to illuminate the outside it provides only minimal light and is not hands-free. In other words, one would have to hand direct and hold the lighting device while still connected to the purse therefore holding the purse as well in order to use the device.

U.S. Pat. No. 3,976,871 to Atherton discloses a handbag with means for illuminating the interior. The handbag has a frame to which a flexible pouch is attached forming the handbag. One leg of the frame carries a curved cavity in which a pair of batteries, a switch and an incandescent light bulb is housed. A transparent window covers the cavity at the light bulb. When the light bulb is switched on it illuminates the contents of the handbag. Inasmuch as a transparent window covers the bulb, the contents of the bag are prevented from contacting the hot incandescent light bulb. The bulb will not break easily if the bag is turned upside down. However, the light source is far away from the handbag contents. As such, it provides limited illumination for contents of the handbag. Articles are likely to shadow each other, preventing full visibility and the light cannot be removed or focused outside the bag to illuminate a workspace next to or at a distance from the bag and/or light.

U.S. Pat. No. 4,332,007 discloses a miniature utility flashlight comprising two batteries and two lamps. A transparent serrated light-distributing surface covers the light bulbs. When the switch is turned on the lamps can be energized sequentially or simultaneously, illuminating objects through the serrated transparent cover. This self-contained miniature utility light can be attached to a garment or pocketbook using a variety of attachment means, including a hook and pile attachment mechanism. Such a device is not technically a pocketbook light. Rather, it is a self-contained miniature flashlight, which can be used for a variety of applications. Although this light can be taken out of the purse to illuminate the outside it provides only minimal light and is not hands-free. In other words, one would have to hand direct and hold the lighting device while still connected to the purse therefore holding the purse as well in order to use the device.

U.S. Pat. No. 4,517,627 discloses a spotlight for a handbag and like receptacles. The device comprises a compact flashlight powered by a dry cell and activated by a switch. A conical reflector attached to one side of the flashlight produces the spotlight. The other side of the flashlight can be detachably attached to the sidewall of a handbag. This self-contained spotlight can be easily removed from the pocketbook. It can be used for other purposes than illuminating a pocket book. Since it is detachably attached to the sidewalls of a handbag, the collimated spotlight essentially directs a light beam on the other sidewall of the handbag, and does not effectively illuminate the contents of the bag. Detaching the spotlight can illuminate the contents of the handbag; but this requires more than two hands. That is to say there would be required: a first hand to hold the spot light; a second hand to hold the bag; and yet another hand to keep the handbag open and look for articles there-within. Moreover, although this light can be taken out of the purse to illuminate the outside it provides only minimal light and is not hands-free. In other words, one would have to hand direct and hold the lighting device while still connected to the purse therefore holding the purse as well in order to use the device.

U.S. Pat. No. 4,912,611 discloses a purse light. The light has two components: (i) a set of batteries connected to an incandescent light bulb; and (ii) a separate switch, which can activate the light bulb when pressed. The light bulb structure and switch structure are attached to a purse. Attachment of the light bulb structure is effected near the top of the purse using detachable hook and loop fasteners. The light bulb assembly faces downwards, illuminating objects in the purse. Attachment of the switch structure is accomplished using hook and loop fasteners disposed in-between the closing and opening frames of the purse, so that the closed position of the frames opens the switch contact and switches the light off. The detachable light structure can be moved outside the purse to illuminate a keyhole in a door or automobile ignition lock. The detachable light bulb structure can be oriented to illuminate required areas in the purse, or removed to illuminate objects external to the purse. Attachment areas for the light bulb structure within the sidewalls of a purse are limited, due to the increased weight of the batteries. Such a device is too bulky for use in illuminating contents of a purse and yet does not provide enough light to illuminate an area where work is to be done. As mentioned the area that can be illuminated is the size of a keyhole. Moreover, once removed the device has to be held therefore using one of the workers hands which does not make the device a hands-free device.

The present invention is directed to a strong, energy efficient light source that is positioned at or around the rim area of a bag, preferably a work bag, that is powerful enough to shine light on a work area up to about 10 feet away while staying attached to the bag and yet be soft enough to illuminate the interior portion of a large work bag. The present inventions is also directed to a backpack having a gooseneck light that can be positioned over the shoulder of a user so as to illuminate the area in front of the user.

In addition, the light source can have multiple lights for alerting drivers of the whereabouts of the user using the backpack. Although the above patents discuss a bag light they are directed to purse lights and are not designed to be directional so as to shine up to about 10 feet or more away from the bag. The prior art lighted bags are also not designed to extend out of the bags to provide light to a work place as with the workbag or illuminate the path and alert drivers of the whereabouts of the user wearing the backpack. For these reasons as well as others the above patents do not describe the present invention.

Therefore, there remains a need in the art for a workman's lighted bag in which the light is directionable and can be operated hands-free. In addition, a need also remains for a lighted backpack that can be used hands free to illuminate the immediate surroundings of a person wearing the backpack. The lighted backpack will help keep children safe when walking to school in the dim light of the morning and back home at dusk.

In either embodiment, the light must provide sufficient light so as to be useful to a craftsman lighting up a particular work area that is often tens of feet away from the light source or to light up a sufficient area in front of a student wearing the lighted backpack so as to make walking in dim light safer. It is essential that the design of the device not require either hand to hold open, position, focus or conduct any other task so as to leave the craftsman's hands free to do the job or the student to carry other items. The above-mentioned prior art devices do not provide such devices. In fact, the workbag/backpack having a directionable light source of the present invention overcomes the problems and shortcomings of the prior art and fills the need in the field of construction, mobile mechanics, handyman repairs as well as provides the much needed light for school children walking to and from school in the. The present invention is further described in the sections and figures set forth below.

SUMMARY OF THE INVENTION

The present invention provides a lighted workbag in which a light-producing member provides significant illumination to the interior portion of a large workbag and/or an external work area. The size of the bag as well as the type of light being mounted on or near the rim portion of the workbag makes the amount of heat generated by the illumination means less of an issue than when used in smaller purse sized bags. However, it is within the scope of the present invention as to use an illumination system that generates large directional lighting while using as little energy as possible thereby generating only small amounts of heat energy as a byproduct. The directional lighting system can be part of the bag rim that allows the light to be focused towards an area where work is to be preformed or can be detachable so as to position the light to illuminate a work area.

As stated above, the lighting system of the present invention can be configured so that it can be detached from the bag and used separately. However, the device once detached, has to be configured so as to attach to a stationary object or be able to stand on its own so that the light can be shinned on the work place without having to hold the light.

In one embodiment of the present invention, the workbag rim light may contain a portion that extends into the bag so as to provide additional light when looking throughout the bag for tools, keys or other objects within the bag. This additional lighting can be added to the rim light or be an integral part of the system that can be removed to provide additional spot lighting even when the main rim light is focused onto an area several feet away from the workbag.

Another embodiment of the present invention provides a backpack with a flexible light producing member comprising a pliable sack having a front wall, a rear wall, a first side wall, a second side wall, a bottom surface and a top surface defining a compartment, wherein a surface of the first side wall, the second side wall, the bottom surface and the top surface facing the compartment comprises a frame supporting the pliable sack. The backpack is equipped with a column having a flexible elongated gooseneck light system positioned in a column on the back of the backpack. The column is positioned of center and substantially near the top surface and is configured to hold the light producing member and a battery back for powering the light-producing member. The flexible lighted gooseneck is configured to provide light over the shoulder of a user when the backpack is worn.

Generally stated, the light apparatus of either the workbag or backpack comprises a battery power source coupled with a switch adapted so that it can be activated remotely or by turning or pressing an actuator switch to the on position. The workbag/backpack light may be selected from the group consisting of a light-emitting diode (LED), a halogen bulb, a xelogen bulb, a fluorescent bulb, a neon bulb, a fiber-optic filament, an incandescent bulb, and combinations thereof. The invention is further described in the Detailed Description section and the figures described below.

BRIEF DESCRIPTION OF DRAWINGS

The invention will be more fully understood and further advantages will become apparent when reference is had to the following detailed description and the accompanying drawings, in which:

FIG. 7 is a schematic diagram illustrating an apparatus for illuminating a workbag and/or an area around the bag showing a back view of the Backpack having a light folded in holding pouch.

DESCRIPTION OF THE PREFERRED EMBODIMENTS

Figure 1:
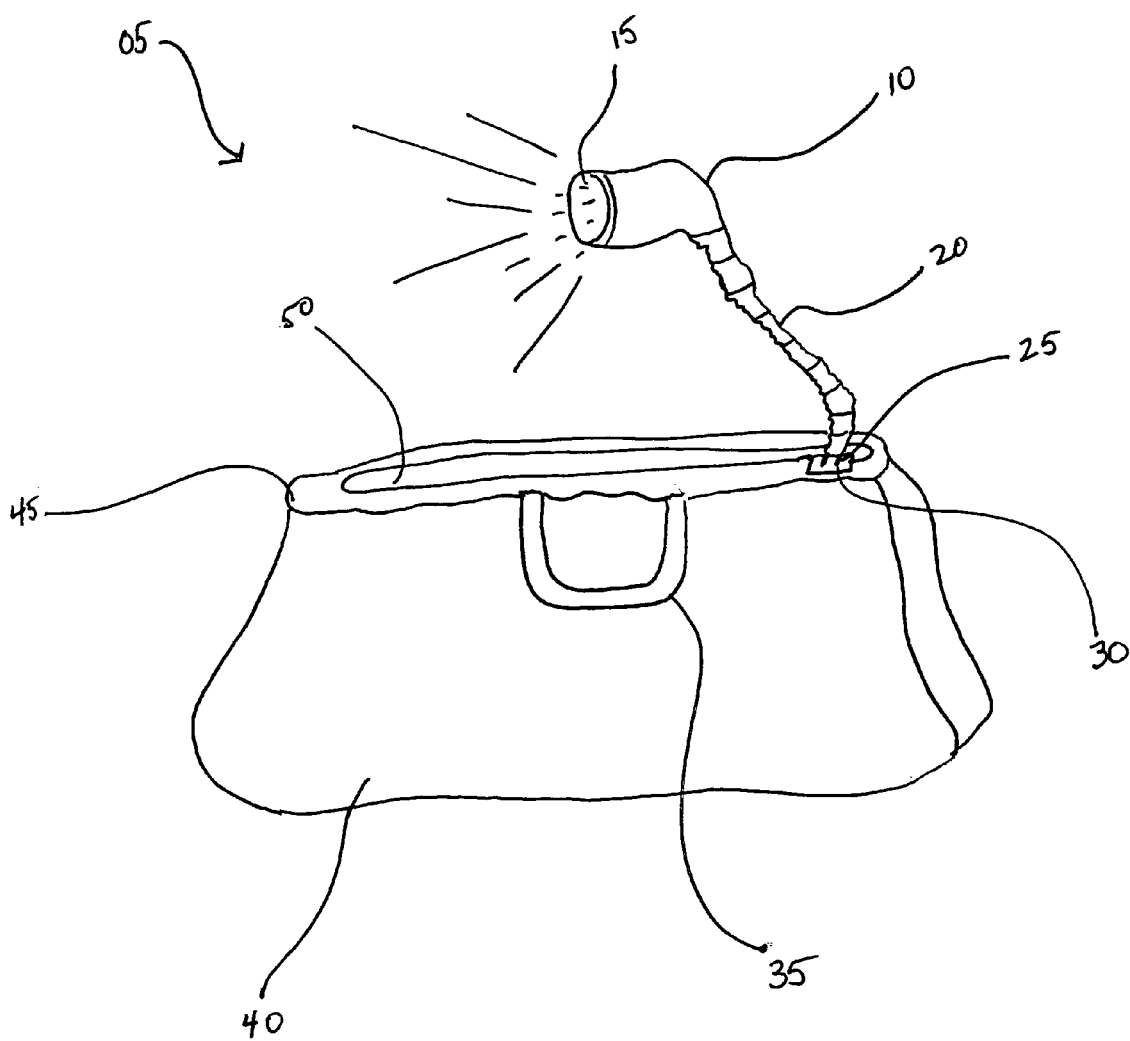
FIG. 1 schematically illustrates one embodiment of the present invention wherein the light is attached to the rim of a work bag and is shinning light to a distant area away from the bag.

Workbags used to carry tools are typically large and generally contain a large number of tools and measuring devices, such as screwdrivers, wrenches, metering devices, drill bits, measuring tape, wire cutters etc and the tools in the bag are directly related to the tradesman using the work bag. Although a conventional work bag contains a standard flashlight, it does not contain a hands free mounted light producing member that can illuminate surrounding work areas, as well as, the interior portion of the bag so as to aid the user to find small tools dispersed throughout the in the workbag. In darkened work areas such as construction sites, hallways, alleyways and the like, workers need to locate critical items needed to complete a job. At the same time need to illuminate the area where the work is being completed.

The present invention provides a lighted workbag having a light-producing member in the form of an optical fiber, LED, light pipe or similar device to transmit the light from the light source to an area several yards away from the bag. The light source can be automatically activated every time the bag is opened or can be manually activated by the user.

The present invention also provides a backpack having a light-producing member extending from either a pouch in the internal or external cavity of the backpack or from an external pouch or column positioned so as to permit the light-producing member to extend over the shoulder of the user to illuminate a path as the user walks freely. In one embodiment of the invention, the external pouch holding the light-producing member is made from a sealed clear plastic having a closure means to keep the light-producing member out of the rain. The light-producing member can have a secondary light positioned within the pouch so as to alert drivers of the person wearing the backpack. This light can be continuous or can blink on and off.

Whether it is a workbag or a backpack, the uniquely positioned light member comprises an incandescent light source or an LED linked by the optical fiber light pipe with a directional means that allows the light to be shinned into the interior portion of the workbag/backpack in order to illuminate the contents of the therein. The light from the optical fiber light pipe can be extracted at selected locations to provide a broad light ray or localized to provide a more powerful light ray for distant illumination.

Another embodiment of the present invention utilizes an omni-directional optical light pipe having light extraction device to illuminate the contents of the workbag so that objects therein are readily identified. The optical light pipe and light extraction devices located thereon are composed of thermally insulating, transparent plastics, which virtually eliminate breakage or shard formation. The transmission of light from solid-state light emitting diodes (LEDs) or an incandescent light source using an optical fiber light pipe and extraction means does not produce high temperatures naturally associated with other light sources. Advantageously, use of the optical light pipe and light extraction means does not damage heat-sensitive materials inside the workbag and/or backpack, and any injuries that may be caused by skin contact are substantially reduced.

As stated above, LEDs can be used so as to reduce the amount of heat produced by the light. LEDs are robust and eliminate shadowing of the tools/items in the workbag/backpack that may make them harder to find. Also LEDs are more durable than other conventional light sources. To reduce damage, ends of single fibers are encased in transparent polymer to prevent fiber damage and skin injury. Other embodiments include lighting with a LED as a light source. LEDS are available in red, green, and blue. The human eye is most light sensitivity to green, with the result that green LEDS can be used but all three colored LED lights when combined produce a nearly white light, which is coupled with a transparent optical light-transmitting device and is preferred. LEDs are inherently robust since they are solid-state devices, which are fully encapsulated. Placing them in a transparent plastic tube or sheet-pouch may further harden the wiring and the LEDS. Since these LEDs produce very little heat, they can be safely encapsulated in this manner, to protect them against damage from tools in the workbag.

Damage to the light source caused by direct contact with tools in the workbag/backpack is minimized by the type of light used as well as the placement of the light source. That is, strategically placing the light source under the rim outside the holding area in the workbag and at the top of a backpack provides additional protection from damage. Tucking of the light source under the rim of the workbag protects the light source from coming in direct contact with the tools. Positioning the light source at the upper half of the backpack protects it from coming in direct contact with the ground when the backpack is thrown on the ground. In either the workbag or the backpack the candle strength of the light-producing member may vary. Accordingly, the light-producing member is designed to accept additional segments in order to increase light into the workbag or provide additional light to a work area.

Another source of light that may be used is a fiber optic bundle having different strands terminated at different lengths that correspond to interior sections of the workbag appointed to receive illumination since the size of the workbag can vary greatly. The light emitting diodes can be connected in parallel, and can be oriented to illuminate the interior of the workbag or outside work place. This type of light source is particularly fun in backpacks since backpacks are predominantly used by school children. The invention is further described in reference to the figures. The lighted backpacks can be used to promote safety when used by school children on the way to school in the dimly lit hours of the morning or for camping, reading, or many other outdoor or indoor activities that may take place in dim light.

FIG. 1 shows a front schematic view of the light-containing workbag of the present invention. In this figure the lighted workbag (05) contains a light-producing member (10) having an extendable gooseneck (20) that is both easy to use as well as being durable. At one end of the extendable gooseneck (20) is a lens (15) that focuses the light as well as protects the light bulb. At the other end of the gooseneck (20) is a plug-like structure (30) that is configured to attach to and attachment point (25) positioned in or near the rim of the bag. The attachment point (25) and the plug (30) are both configured so as to connect to one another. The workbag also has a handle (35) with a large bag (40) designed for holding both large and small tools. The rim (45) of the workbag (05) defines the opening (50) into the bag.

Figure 2:
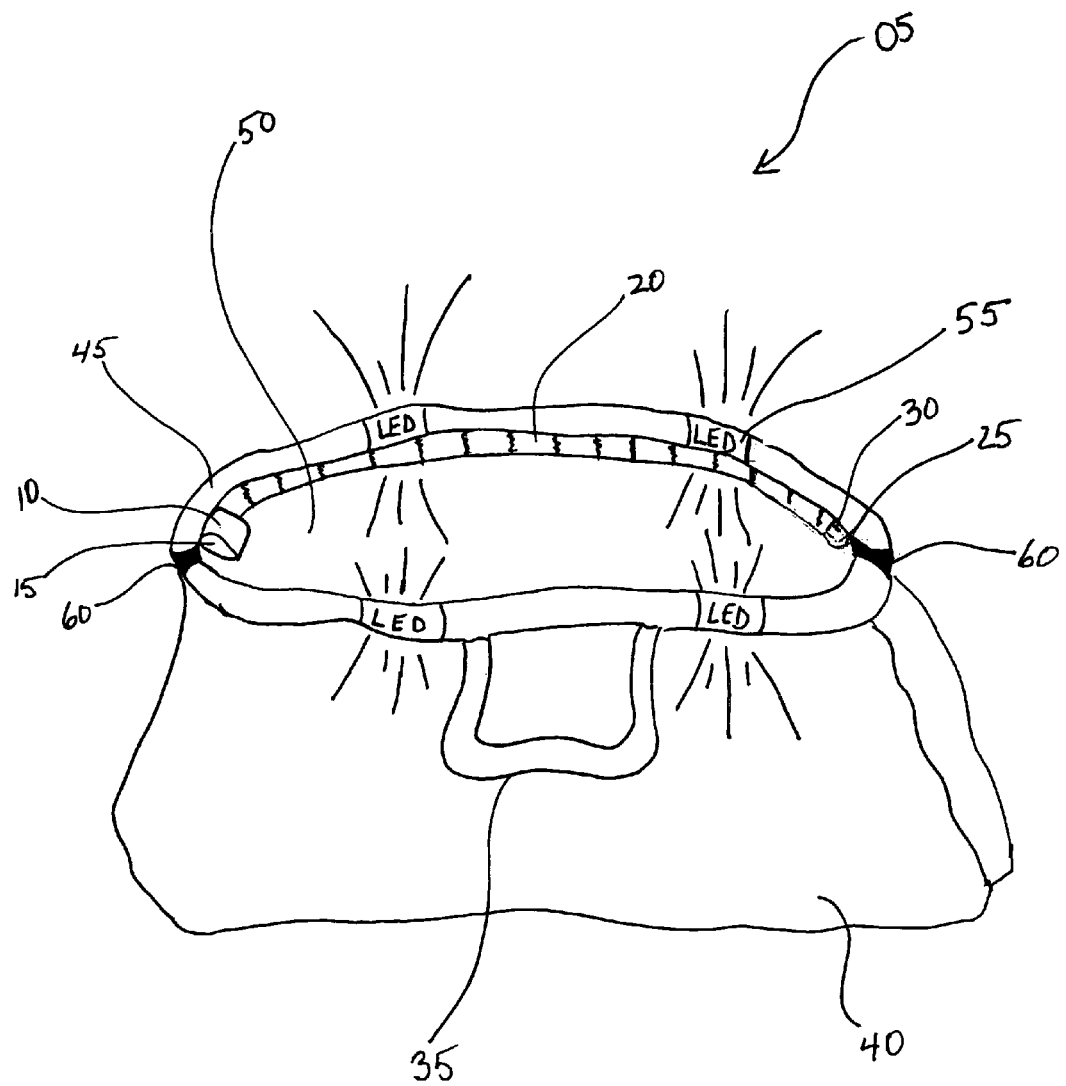
FIG. 2 is a schematic diagram illustrating an apparatus for illuminating a work bag and/or an area around the bag containing a light emitting diode (LED) or incandescent light source, optically coupled to a folded light pipe located at the near mid-plane of the workbag, and a light extraction means for downwards illumination.

FIG. 2 shows a similar schematic view of the workbag (05) except that the workbag (05) is in the opened position showing the rim lighting (55) as well as the light-producing member tucked away under the rim (45) of the workbag (05). In this position the light-producing member (10) is positioned under the rim and can be activated so as to focus light into the bag (05). At opposite ends of the workbag (05) are hinges (60) that are designed to allow the rim (45) of the workbag (05) to open widely so as to produce a wide opening (50) in order to allow tools to be removed.

Figure 3:
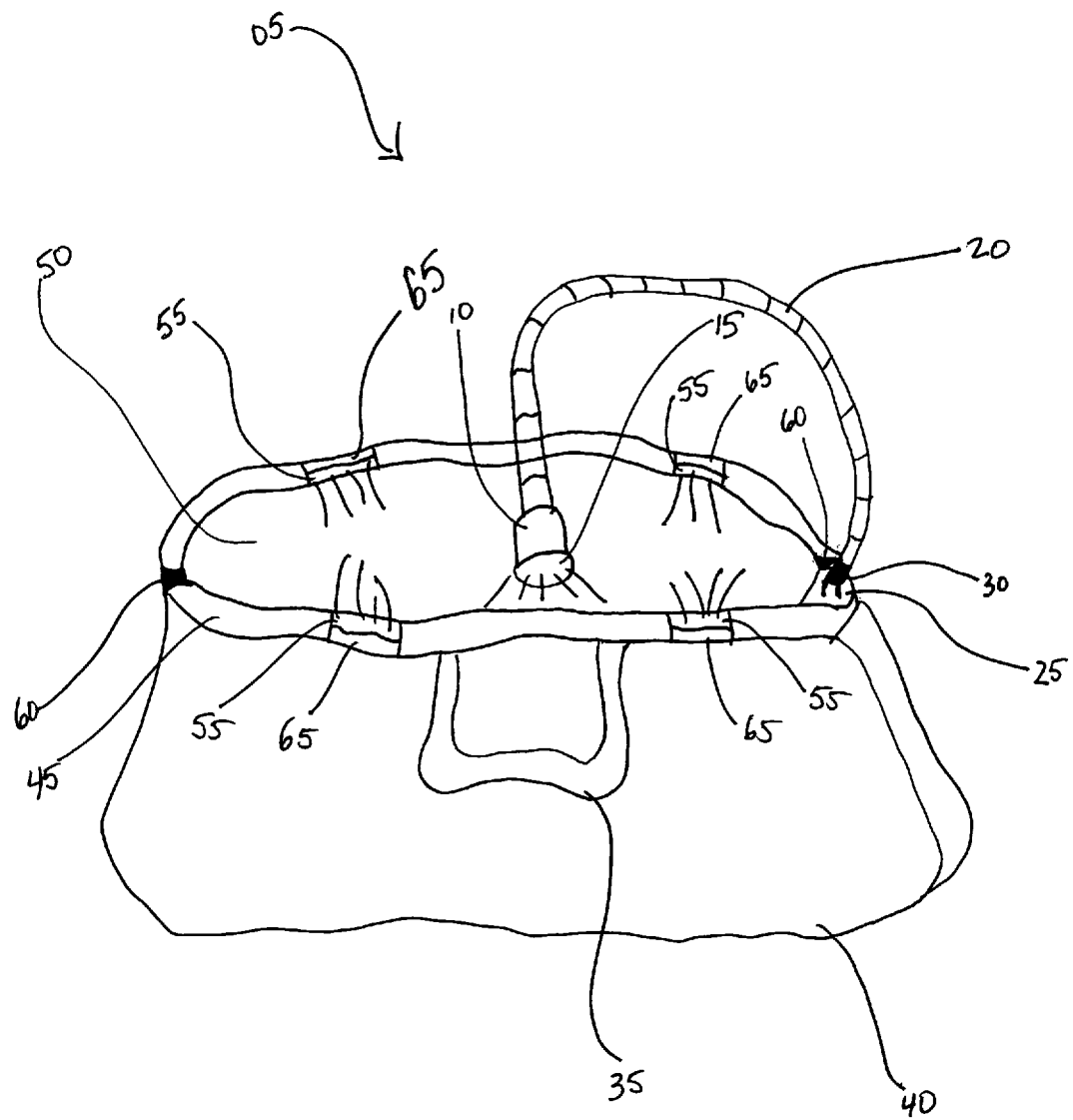
FIG. 3 is a schematic diagram illustrating an apparatus for illuminating a workbag and/or an area around the bag with the light extended out of the bag and directed into the bag.

FIG. 3 shows another embodiment of the present invention using all of the elements of FIGS. 1 and 2 along with some additional features. In this view, the light-producing member (10) is turned on and is positioned within the opening (50) of workbag (05) so that a worker can view the items in the bag more easily. In addition, the rim lights may have a lens cover (65) that can be opened and closed so as to direct the light either away or towards the inside of the bag. When the light is directed into the bag the user can use it to find items stored in the workbag (05). Once the items are found, the user can position the gooseneck light (35) in the direction of work to be completed in order to safely illuminate a work area hands free so as to leave the worker's hands free to work.

Figure 4:
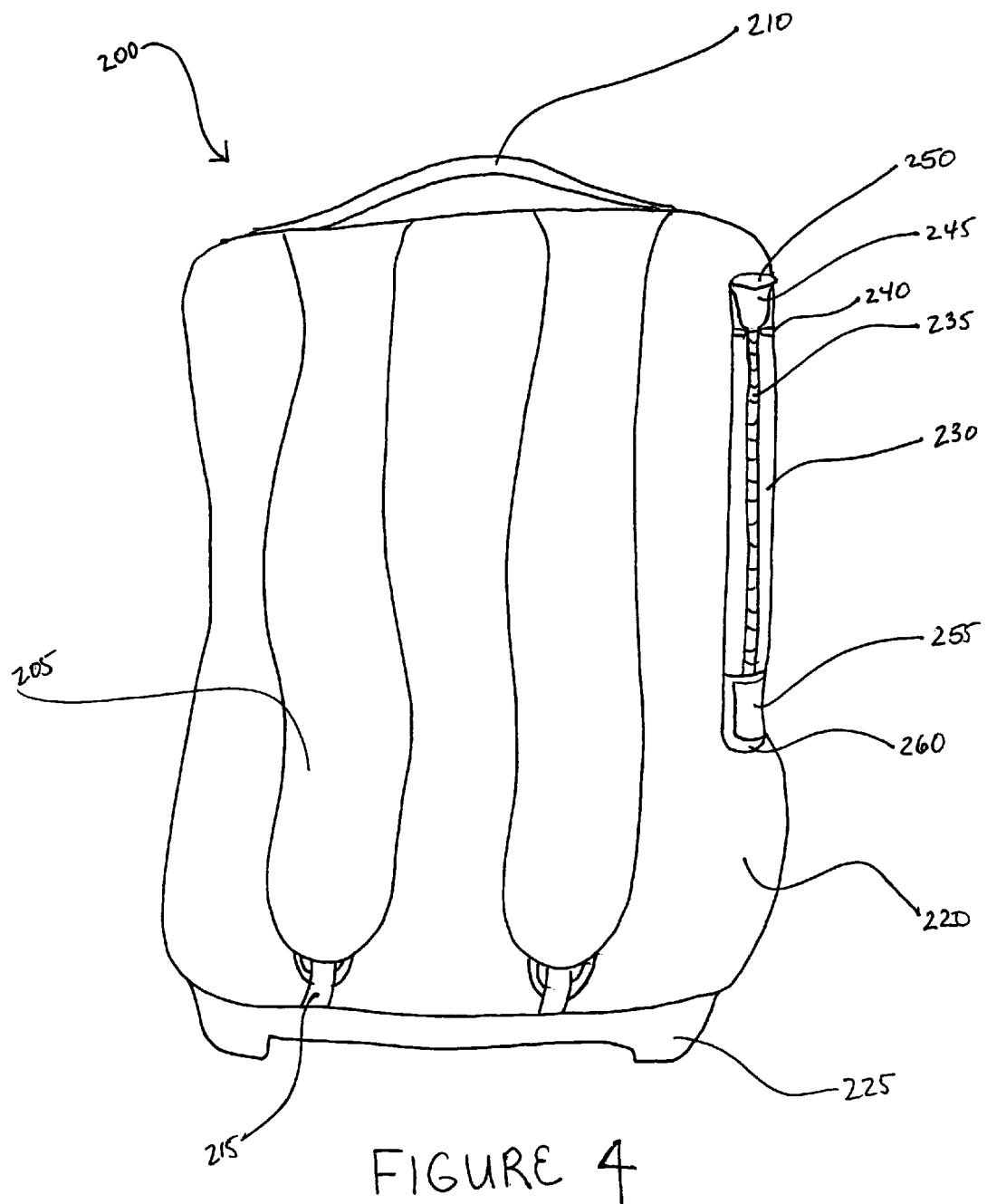
FIG. 4 is a schematic diagram illustrating an apparatus for illuminating a workbag and/or an area around the bag having a light retracted within a holding column.

FIGS. 4-7 shows still yet another embodiment of the present invention in the form of a backpack. FIG. 4 shows a backpack (200) having a multiple of straps (205) for carrying the bag on a user's back. Although the backpack is shown with multiple straps it is within the scope of the invention to have a single strap. The straps (205) may have an extension (215) that allows the straps (205) to be adjusted to fit different size backs. The backpack (200) may also have a handle (210) for carrying the backpack (200) and a stand (210) to place the backpack (200) in the upright position when put down on the floor. Positioned off center on the back (220) of the backpack (200) is an elongated column (230) configured to hold the light producing member when not in use.

The column (230) is configured so as to have and internal cavity large enough and long enough to fit the gooseneck (235) of the lighting system in an extended position. The column (230) is also equipped with a collar stop (240) located near the top of the column (230) that is designed to hold the gooseneck (235) in place and cradle the light (245) so that the light (245) does not get broken when not in use. At the end of the gooseneck (235) opposite the light (245) is a removable battery back (260). The battery pack (260) can either be changed or charged through a battery access door (255) located at the lower end of the column (230). The light (245) attached to the gooseneck (235) has a lens (250) that can be clear or colored/the lens (250) protects the light from impact and/or the light from coming in direct contact with the skin of the user thereby reducing the risk of burns.

Figure 5:
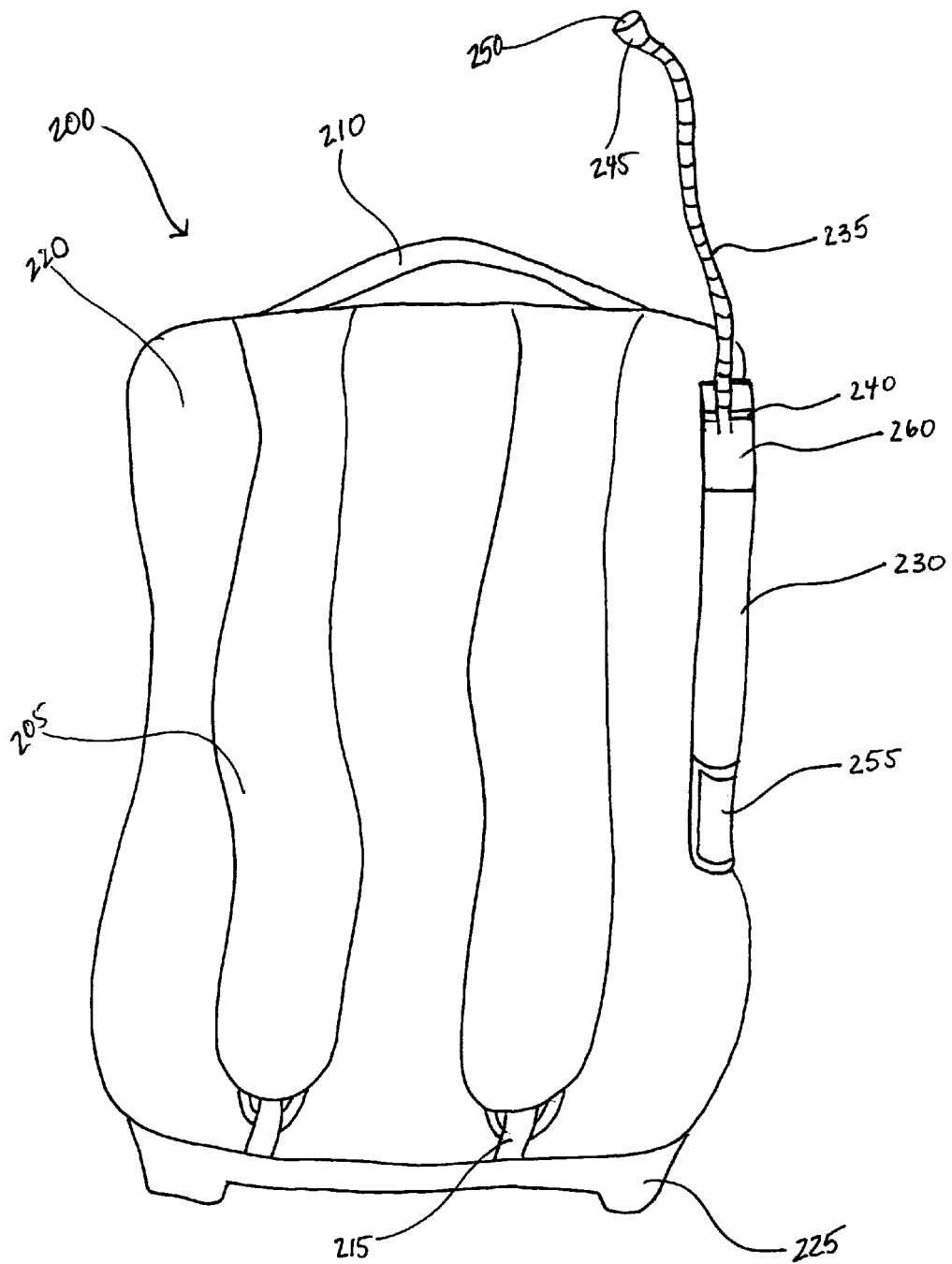
FIG. 5 is a schematic diagram illustrating an apparatus for illuminating a workbag and/or an area around the bag shows a back view of the Backpack having a light extended from the holding column.

FIG. 5 shows that backpack (200) wherein the light (245) attached to the gooseneck (235) is extended out of the column (230) by pulling on the top pull (275). The gooseneck containing all necessary wiring has a light (245) at one end and a battery pack (260) at the other end of the gooseneck (235). The gooseneck/light is prevented from coming out of the column by the collar stop (240). That is, when the battery pack of the gooseneck (235) comes in contact with the collar stop (240) the gooseneck can not be pulled out of the column (230) any further thereby preventing the gooseneck (235) from being pulled out of the column (230). The gooseneck (235) can be designed so as to extend even further if the gooseneck (235) itself is configured to be extendable. That is, pulling on the gooseneck (235) by the top pull (275) further unfolds the gooseneck increasing the overall length of the gooseneck (235) without changing its position within the column (230). Once the light (245) is no longer needed the gooseneck (235) can be retracted and pushed back into the column (230) for storage. Retracting the gooseneck (235)/ light (245) can be manually achieved or can be spring-loaded.

Manually retracting of the gooseneck (235)/light (245) back into the holding column when not in use can be achieved by simply pushing the light into place or in the alternative by pulling a retracting pull (285) attached to a cord (280) that feeds through the column and attaches to the lower part of the gooseneck (235)/light (245). Once this is pulled, the gooseneck (235)/light (245) is drawn into the holding column for storage. This operation can be spring-loaded with an actuator switch located in the front of the backpack so that the user can push the actuator and the light extends out of the holding column. Once use of the light is completed, the user can push the actuator again so that the gooseneck (235)/light (245) retracts back into the column.

One type of spring loaded mechanism that can be used is a cord wrapped around a rod that is spring loaded to rotate in the clockwise direction so as to wind up the cord and in the counterclockwise direction to allow the cord attached to the gooseneck (235)/light (245) to unwind. This is much like the mechanism used in a standard retractable measuring tape having a brake. To further automate this process a simple clockwise/counterclockwise motorized arm can be attached to the rod in which the cord is wound to automate the extension/retraction of the gooseneck (235)/light (245).

Figure 6:
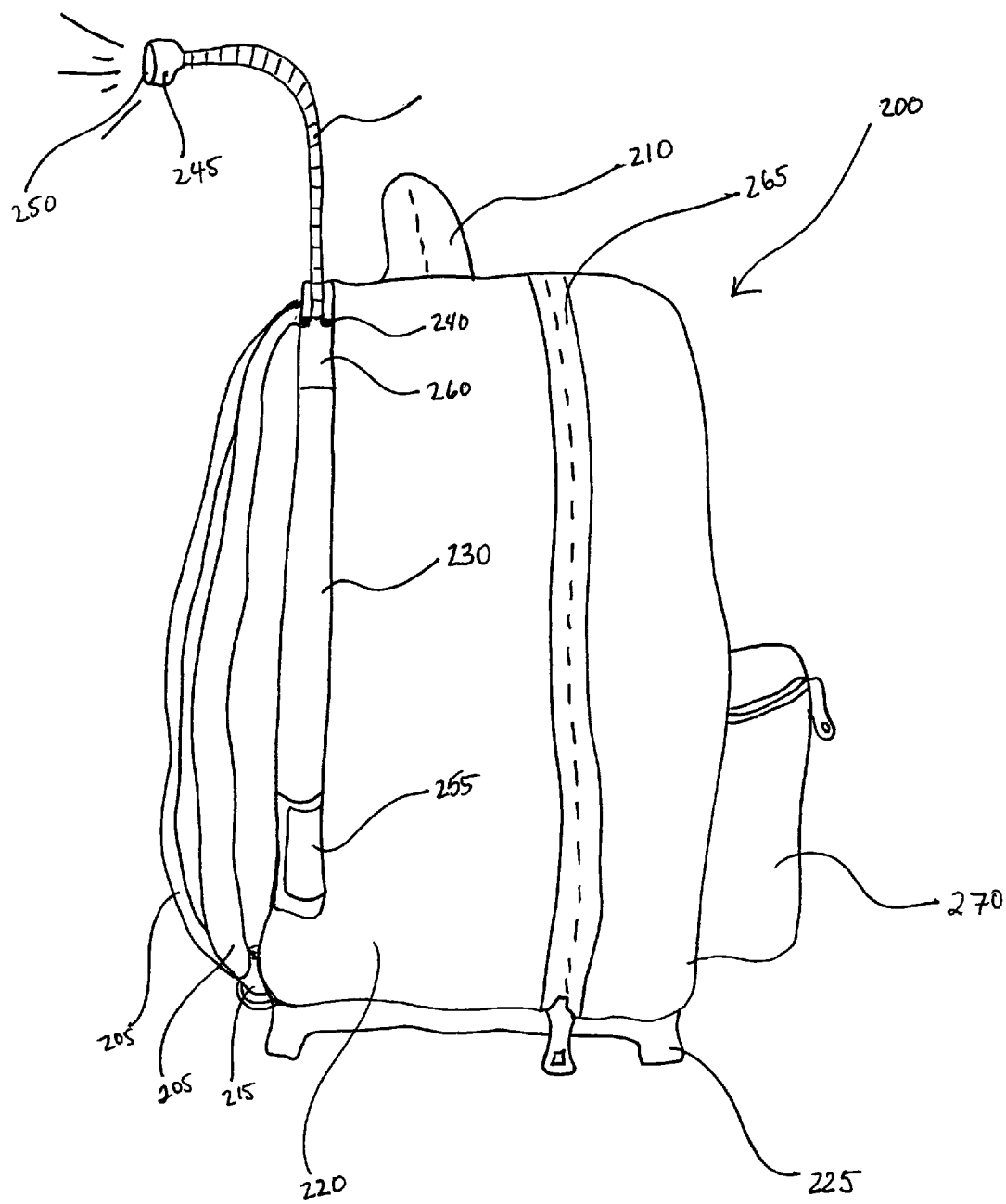
FIG. 6 is a schematic diagram illustrating an apparatus for illuminating a workbag and/or an area around the bag showing a side view of the Backpack having a light extended from the holding column.

Once the gooseneck (235) is extended out of the column (230) the light (245) can be positioned over the shoulder of the user in order to provide light in front of the user. The light can be further focuses by the lens (250) and may be either white light or colored light depending on the color of the lens. In the alternative, the lens can be clear but different color bulbs can be used to give the same effect. As shown in FIG. 6, the extended gooseneck (235) and light (245) can be positioned so that the light (245) is in front of the user so as to light up the path of the user and make the user more noticeable on dimly lit roads. This is all accomplished while keeping the hands of the user free to carry other items or hold hands with a supervising adult.

The light of the above embodiments can be turned on and off either by light sensitive sensors, manually or remotely activating an on/off switch. In one embodiment of the present invention, the on/or switch is activated when the battery pack comes in contact with the collar stop or by rotating the light to the on position.

FIG. 7 shows an alternative embodiment of the backpack (300) of the present invention. The backpack has a handle (300), straps (305) with adjustable extensions (315) and a stand (325) similar to the backpack shown in FIGS. 4-6. However, the configuration and the positioning of the light (330) and gooseneck (335) are different. That is, in FIG. 7 the backpack (300) is equipped with a pouch (345) located off-centered in the upper quadrant of the back of the backpack. The pouch (345) is configured with a flap that opens so as to expose the light (330)/gooseneck (335) apparatus. As with the light system shown in FIGS. 3-6, the light (330) is connected to a battery pack (340) via wires snaked through an internal cavity in the elongated gooseneck (335). The battery pack sits at the bottom of the pouch and can either be replaced or recharged by moving the light (330)/gooseneck (335) apparatus from the pouch or can be changed or replaced through the opening (355) located at the bottom of the pouch.

The light in this embodiment is used by extending the light (330)/gooseneck (335) apparatus partially out of the pouch (345) leaving the battery pack in the pouch (345) to secure the light to the backpack. The gooseneck extends out of the pouch (345) over the shoulder as shown in FIG. 6. Although the configuration of the pouch (345) is different than the column shown in FIGS. 4-6, the light (330)/gooseneck (335) apparatus is virtually the same except that in this embodiment the light (330)/gooseneck (335) apparatus can be totally removed from the pouch (345) and used independent of the backpack (300). The pouch (345) can be clear or made from the same material as the backpack and may include reflectors or an additional alert light.

Since many of the backpacks sold today are used by children going to school, having a light to light up the path in front of them early in the morning when walking either to school or to the bus stop will reduce injuries due to falls. In addition, the light makes the children more noticeable to drivers on the road and therefore will reduce injuries caused by automobile accidents. Accordingly, the gooseneck of the embodiments described in FIGS. 4-7 can be equipped with at least one additional light that can either blink or stay lit when the main light is activated. These lights can be used to make the user more visible to oncoming traffic.

The lights of the present invention used standard wiring procedures that one skilled in the art would fully understand and be able to achieve. The back packs and workbag of the present invention can be made of cloth, nylon, cotton, polyester, man made materials and combinations therefore as well as any other acceptable material. The lights and gooseneck can be made of plastic, composite, stainless steel, aluminum, alloys or mixture thereof. The lights can be coated and/or chemically treated to increase weatherability as is well know in the art.

Various types of lighting can be used in any of the embodiments of the present invention including those selected from the group consisting of light-emitting diode (LED), a halogen bulb, a xelogen bulb, a fluorescent bulb, a neon bulb, a fiber-optic filament, an incandescent bulb, and combinations thereof.

Having thus described the invention in rather full detail, it will be understood that such detail need not be strictly adhered to, but that additional changes and modifications may suggest themselves to one skilled in the art, all falling within the scope of the invention as defined by the subjoined claims. While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

What is claimed is:

1. A bag with a flexible light-producing member for illuminating said bag and surroundings comprising;
   an openable top end having a rim extending around the inner perimeter of said openable top end, a sealed bottom end and sealed opposite side ends;
   a light producing member attached to a positionable flexible elongated arm at one end and the positionable flexible elongated arm is attached to the rim at the opposite end, the flexible elongated arm is configured to maintain its position and support the light producing member in a multiplicity of positions without additional attachment to a surface so as to illuminate inside the bag and outside of the bag surroundings; and
   said rim configured to secure said light producing member wherein at least a portion of said light producing member is configured so as to be positionable in the direction in which light is to be shinned.

2. The bag of claim 1 further comprising a pouch spaced substantially parallel from one of said sealed ends configured to secure a battery pack for powering said light producing member, said pouch having an opening into said pouch in which said battery pack can be removed.

3. The bag of claim 1 wherein said flexible light producing member is selected from the group consisting of a light-emitting diode (LED), a halogen bulb, a xelogen bulb, a fluorescent bulb, a neon bulb, a fiber-optic filament, an incandescent bulb, and combinations thereof.

4. The bag of claim 1 wherein the flexible light producing member is a gooseneck light assembly.

5. The bag of claim 4 wherein said battery pack for powering said light producing member is a rechargeable battery pack detachably connected to said light producing member.

6. The bag of claim 5 further comprising an actuator that is associated with said light producing member that turns on said light when said bag is opened.

7. The bag of claim 5 further comprising an additional smaller light unit detachable from said light producing member to provide additional light to specific areas.

8. The bag of claim 5 wherein the light-producing member is a focusable LED linked to an optical fiber light pipe.

9. A backpack with a flexible light producing member comprising:
   a pliable sack having a front wall, a rear wall, a first side wall, a second side wall, a bottom surface and a top surface defining a compartment, wherein a surface of said first side wall, said second side wall, said bottom surface and said top surface facing the compartment comprises a frame supporting said pliable sack;
   a light producing member attached to a positionable flexible elongated arm at one end and the positionable flexible elongated arm is attached to the rim at the opposite end, the flexible elongated arm is configured to maintain its position and support the light producing member in a multiplicity of positions without additional attachment to a surface so as to illuminate inside the bag and outside of the bag surroundings; and an elongated column positioned off centered and substantially near said top surface, said elongated gooseneck arm having a light is configured to hold said light producing member and battery pack, said elongated column having a stop that is configured to prevent said elongated gooseneck arm having a light from being detached from said column, said flexible elongated gooseneck arm having a light configured to provide light over the shoulder of a user when said backpack is worn.

10. The backpack of claim 9 wherein said light is selected from the group consisting of a light-emitting diode (LED), a halogen bulb, a xelogen bulb, a fluorescent bulb, a neon bulb, a fiber-optic filament, an incandescent bulb, and combinations thereof.

11. The backpack of claim 9 wherein said elongated gooseneck arm having a light further comprising additional light sources at multiple positions on said elongated gooseneck.

12. The backpack of claim 9 wherein said battery back for powering said light is a rechargeable battery pack detachably connected to said light.

13. The backpack of claim 9 further comprising an additional light that can be positioned so as to face in the opposite position said light connected to the end of said gooseneck.

14. The backpack of claim 9 wherein said additional light has a blinking mode.

15. The backpack of claim 9 wherein said light producing member is a directional optical fiber light pipe.

16. A backpack with a flexible light producing member comprising:

a pliable sack having a front wall, a rear wall, a first side wall, a second side wall, a bottom surface and a top surface defining a compartment, wherein a surface of said first side wall, said second side wall, said bottom surface and said top surface facing the compartment comprises a frame supporting said pliable sack;

light producing member attached to a positionable flexible elongated arm at one end and the positionable flexible elongated arm is attached to the rim at the opposite end, the flexible elongated arm is configured to maintain its position and support the light producing member in a multiplicity of positions without additional attachment to a surface so as to illuminate inside the bag and outside of the bag surroundings; and a pouch positioned substantially near said top surface of said backpack, said pouch configured to hold said flexible elongated arm having a light producing member and a battery pack for powering said light producing member, said pouch having an opening configured wherein said flexible elongated arm having a light producing member can extend out of and be positioned so as to extend over the shoulder of a user when said backpack is worn on a users back.

17. The backpack of claim 16 wherein said light is selected from the group consisting of a light-emitting diode (LED), a halogen bulb, a xelogen bulb, a fluorescent bulb, a neon bulb, a fiber-optic filament, an incandescent bulb, and combinations thereof.

18. The backpack of claim 16 wherein said flexible elongated arm having a light further comprises at least one additional light source positioned on said elongated arm in a position other than said light.

* * * * *